US012725888B2

(12) United States Patent
Cho et al.

(10) Patent No.: US 12,725,888 B2
(45) Date of Patent: Sep. 1, 2026

(54) METHOD FOR WELDING ELECTRODE ASSEMBLY

(71) Applicant: LG Energy Solution, Ltd., Seoul (KR)

(72) Inventors: Hee Yoon Cho, Daejeon (KR); Young Seok Baek, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 601 days.

(21) Appl. No.: 18/033,212

(22) PCT Filed: Apr. 19, 2022

(86) PCT No.: PCT/KR2022/005610
§ 371 (c)(1),
(2) Date: Apr. 21, 2023

(87) PCT Pub. No.: WO2022/225309
PCT Pub. Date: Oct. 27, 2022

(65) Prior Publication Data

US 2023/0299433 A1 Sep. 21, 2023

(30) Foreign Application Priority Data

Apr. 21, 2021 (KR) ........................ 10-2021-0051986

(51) Int. Cl.
*H01M 50/536* (2021.01)
*H01M 50/533* (2021.01)
(Continued)

(52) U.S. Cl.
CPC ....... *H01M 50/536* (2021.01); *H01M 50/533* (2021.01); *H01M 50/54* (2021.01); *H01M 50/595* (2021.01)

(58) Field of Classification Search
CPC ............................ H01M 50/536; H01M 50/54
See application file for complete search history.

(56) References Cited

U.S. PATENT DOCUMENTS 10,434,595 B2 10/2019 Gwon et al.
2007/0029368 A1 * 2/2007 Kubouchi ................ H01G 9/06 361/313

(Continued)

FOREIGN PATENT DOCUMENTS

CN 204271174 U 4/2015
CN 110326130 A 10/2019

(Continued)

OTHER PUBLICATIONS

International Search Report for PCT/KR2022/005610 mailed Aug. 4, 2022. 3 pages.

(Continued)

*Primary Examiner* — Kendra Ly
(74) *Attorney, Agent, or Firm* — Lerner David LLP

(57) ABSTRACT

Provided is a method for welding an electrode assembly comprising stacking a plurality of electrodes to manufacture the electrode assembly, attaching a buffer tab to a surface of an outermost electrode tab of the electrode assembly, and welding a lead such that a plurality of electrode tabs and the lead are in contact with each other to dispose the buffer tab therebetween. The electrode assembly comprises the stacked plurality of electrodes comprising the lead welded to the plurality of electrode tabs, and each electrode tab of the plurality of electrode tabs protrudes in one direction from the plurality of electrodes.

The buffer tab may be attached, before the welding, to the surface of the outermost electrode tab to minimize or prevent damage to the electrode tab due to pressure applied by a welding rod.

18 Claims, 6 Drawing Sheets

(51) Int. Cl.
*H01M 50/54* (2021.01)
*H01M 50/595* (2021.01)

(56) References Cited

U.S. PATENT DOCUMENTS

| | | | | |
|---|---|---|---|---|
| 2011/0104520 | A1 | 5/2011 | Ahn | |
| 2017/0069929 | A1* | 3/2017 | Kim | H01M 50/538 |
| 2018/0358608 | A1* | 12/2018 | Mino | H01M 10/0583 |
| 2019/0013506 | A1 | 1/2019 | Park | |
| 2020/0014016 | A1 | 1/2020 | Kim et al. | |
| 2020/0185690 | A1 | 6/2020 | Kim et al. | |
| 2020/0287195 | A1 | 9/2020 | Kim et al. | |
| 2021/0135321 | A1 | 5/2021 | Chen | |
| 2022/0021085 | A1 | 1/2022 | Xie et al. | |
| 2022/0255201 | A1 | 8/2022 | Kim et al. | |

FOREIGN PATENT DOCUMENTS

| | | | |
|---|---|---|---|
| CN | 110462881 | A | 11/2019 |
| CN | 210136972 | U | 3/2020 |
| CN | 111373574 | A | 7/2020 |
| EP | 3800718 | A1 | 4/2021 |
| JP | 2012209260 | A | 10/2012 |
| JP | 2014167881 | A | 9/2014 |
| KR | 20060033642 | A | 4/2006 |
| KR | 20110048470 | A | 5/2011 |
| KR | 20170028789 | A | 3/2017 |
| KR | 101770334 | B1 | 8/2017 |
| KR | 20170114404 | A | 10/2017 |
| KR | 20180072065 | A | 6/2018 |
| KR | 20180101034 | A | 9/2018 |
| KR | 102032773 | B1 | 10/2019 |
| KR | 102061309 | B1 | 12/2019 |
| KR | 20200142683 | A | 12/2020 |

OTHER PUBLICATIONS

Extended European Search Report including Written Opinion for Application No. 22792009.7 dated Jul. 16, 2024, pp. 1-7.

Search Report dated Sep. 26, 2025 from the Office Action for Chinese Application No. 202280007120.7 issued Sep. 29, 2025, 3 pages.

* cited by examiner

METHOD FOR WELDING ELECTRODE ASSEMBLY

CROSS-REFERENCE TO RELATED APPLICATIONS

The present application is a national phase entry under 35 U.S.C. § 371 of International Application No. PCT/KR2022/005610, filed on Apr. 19, 2022, which claims the benefit of the priority of Korean Patent Application No. 10-2021-0051986, filed on Apr. 21, 2021, which are hereby incorporated by reference in their entireties.

TECHNICAL FIELD

The present invention relates to a method for welding an electrode tab and a lead of an electrode assembly, and more particularly, to a method for welding an electrode assembly, which can solve problems such as folding or disconnection caused by local stress and tensile force occurring in a welded portion when spot welding is performed on an electrode tab and a lead.

BACKGROUND ART

The demand for secondary batteries as energy sources rapidly increases in various fields including personal portable terminal and electric vehicle fields.

Secondary batteries may be variously classified according to materials and outer shapes of a positive electrode and a negative electrode. Among the secondary batteries, lithium secondary batteries made of lithium compound materials are widely used in place of typical nickel-cadmium secondary batteries, etc., because of their large capacity and low self-discharge rate.

In addition, the lithium secondary batteries may be manufactured in various forms, and it is common to be representatively manufactured in a cylinder type, a prismatic type, or a pouch type.

Among the types, a pouch type secondary battery has a structure in which an electrode assembly is embedded in a pouch. In the structure, electrode tabs (a negative electrode tab and a positive electrode tab) of the electrode assembly are welded respectively to leads (a negative electrode lead and a positive electrode lead), and one end of each of the leads has a structure protruding outward from the pouch to be electrically connectable to an external device.

That is, the electrode assembly has a structure in which a plurality of electrodes are stacked (a structure in which a negative electrode, a separator, and a positive electrode are repeatedly stacked). In addition, each of the positive electrode and the negative electrode has one side on which each of the positive electrode tab and the negative electrode tab is formed. Each of the electrodes has electrode tabs formed in one direction, and the electrode tabs are gathered into one to be welded to each of the leads. The electrode tabs are gathered into the negative electrode tabs and the positive electrode tabs, respectively, to be welded to the leads.

That is, referring to FIG. 1 illustrating operations of a method according to the related art, in which electrode tabs (positive electrode tabs among negative electrode tabs and positive electrode tabs) of an electrode assembly are gathered and bonded to a (positive electrode) lead, negative electrode tabs 21 (see FIG. 6) protruding from negative electrodes 20, and positive electrode tabs 11 protruding from positive electrodes 10, are also stacked to be parallel together with the negative electrodes 20 and the positive electrodes 10, when each of the negative electrodes 20 and each of the positive electrodes 10 are repeatedly stacked with a separator 30 therebetween.

The negative electrode tabs 21 and the positive electrode tabs 11 respectively have ends that are gathered into one (here, the drawing illustrates that the electrode tabs are gathered in a lower electrode tab, but in some cases, the electrode tabs may be gathered in an intermediate electrode tab or an upper electrode tab), and the electrode tabs in a gathered state are pre-welded so as to prevent separation. Here, the positive electrode tabs 11 and the negative electrode tabs 21 may be disposed to be gathered on the same side of the electrode assembly and may be disposed on opposite sides, respectively. The processes for gathering the same ones may be performed at the same time, or may be separately performed in order.

In a state where the electrode tabs (negative electrode tabs or positive electrode tabs) are gathered, ultrasonic welding is performed on the gathered electrode tabs. Then, after the electrode tabs are in close contact with each of the leads, welding is performed on the leads and the electrode tabs.

Here, spot welding is performed so that the leads and the electrode tabs have a greater bonding force. The spot welding is performed in such a way that the leads and the electrode tabs, which are in contact with each other, are pressed up and down by welding rods, and simultaneously are locally heated by resistive heat generated by the application of a current.

However, when the electrode tabs having a relatively small thickness are pressed by the welding rods, local stress and tensile force occur in a pressed point. Such a stress and a tensile force weaken the rigidity of the electrode tabs to cause a problem that folding or disconnection may occur in a welded point. In addition, there is a problem that when the folding or disconnection occurs, resistance increases during charging or discharging so that heat is generated to cause ignition or explosion of the secondary batteries.

Technical Problem

Thus, the main purpose of the present invention is to provide a method for welding an electrode assembly, which can solve the problem (occurrence of a stress and a tensile force during welding an electrode tab and a lead) of the structure according to the related art as described above.

Technical Solution

The present invention for achieving the purpose as above provides a method for welding an electrode assembly, comprising stacking a plurality of electrodes (negative electrode from which a negative electrode tab protrudes and positive electrode from which a positive electrode tab protrudes) to manufacture the electrode assembly; attaching a buffer tab to a surface of an outermost electrode tab of the electrode assembly; and welding a lead such that a plurality of electrode tabs and the lead are in contact with each other to dispose the buffer tab therebetween, wherein the electrode assembly comprises a stacked plurality of electrodes comprising the lead welded to the plurality of electrode tabs, and wherein each electrode tab of the plurality of electrode tabs protrudes in one direction from the plurality of electrodes.

In the attaching of the buffer tab, the buffer tab is attached to an electrode tab of the plurality of electrode tabs disposed on an uppermost layer and to an electrode tab of the plurality of electrode tabs disposed on a lowest layer.

The method includes, after the attaching of the buffer tab and before the welding of the lead, gathering and pre-welding the plurality of electrode tabs such that each electrode tab of the plurality of electrode tabs is bonded to each other.

The pre-welding comprises ultrasonic welding, wherein the plurality of electrode tabs and the buffer tab in a stacked state are bonded by application of ultrasonic waves, and the welding of the lead comprises spot welding wherein the lead is in contact with the buffer tab.

The method may further include, after the pre-welding and before the welding of the lead, cutting an end portion of the buffer tab and end portions of the plurality of electrode tabs so that an end of the buffer tab and ends of the plurality of electrode tabs are aligned with each other.

The buffer tab may be made of the same material (or a softer material than) as the electrode tabs and may have a surface coated with an adhesive so as to be attachable to the outmost electrode tab.

Alternatively, the buffer tab may be provided as a tape having electrical conductivity and having at least one surface with an adhesive property.

In an embodiment provided in the present invention, the plurality of electrodes may include a positive electrode and a negative electrode, the plurality of electrode tabs may include a negative electrode tab protruding from the negative electrode, and a positive electrode tab protruding from the positive electrode, and the lead may include a negative electrode lead welded to the negative electrode tab, and a positive electrode lead welded to the positive electrode tab. After the stacking of the plurality of electrodes to manufacture the electrode assembly, the attaching of the buffer tab and the welding of the lead may be performed on one of the positive electrode tab and the negative electrode tab, and then the attaching of the buffer tab and the welding of the lead may be re-performed on the other of the positive electrode tab and the negative electrode tab.

In another embodiment provided in the present invention, after the stacking of the plurality of electrodes to manufacture the electrode assembly, the attaching of the buffer tab and the welding of the lead may be completed on one of the positive electrode tab and the negative electrode tab, and then the attaching of the buffer tab and the welding of the lead may be performed on the other after the electrode assembly rotates 180 degrees.

In still another embodiment provided in the present invention, the plurality of electrodes may include a positive electrode and a negative electrode, the plurality of electrode tabs may include a negative electrode tab protruding from the negative electrode, and a positive electrode tab protruding from the positive electrode, and the lead may include a negative electrode lead welded to the negative electrode tab, and a positive electrode lead welded to the positive electrode tab. After the stacking of the plurality of electrodes to manufacture the electrode assembly, the attaching of the buffer tab may be completed on each of the positive electrode tab and the negative electrode tab, and then the welding of the lead may be performed on each of the positive electrode tab and the negative electrode tab.

Advantageous Effects

In the method for welding the electrode assembly according to the present invention having the features as described above, the buffer tab may be attached, before the welding, to the surface of the outermost electrode tab to minimize or prevent damage to the electrode tab due to pressure applied by the welding rod.

The buffer tab may be attached to each of the electrode tab disposed on the uppermost layer and the electrode tab disposed on the lowest layer, thereby mitigating the stresses occurring in both the point in contact with the welding rod and the point in contact with the lead.

Moreover, the electrode tab and the buffer tab may be cut to have ends aligned with each other, thereby preventing the buffer tab from being protruding from the electrode tab by inadvertent attachment.

The buffer tab may be made of the same material as the electrode tab, and may be provided with the surface coated with the adhesive so as to be attachable to the outmost electrode tab, or provided as a tape having electrical conductivity and having at least one surface with adhesive property so that easy attachment may be achieved.

DETAILED DESCRIPTION

Figure 1:
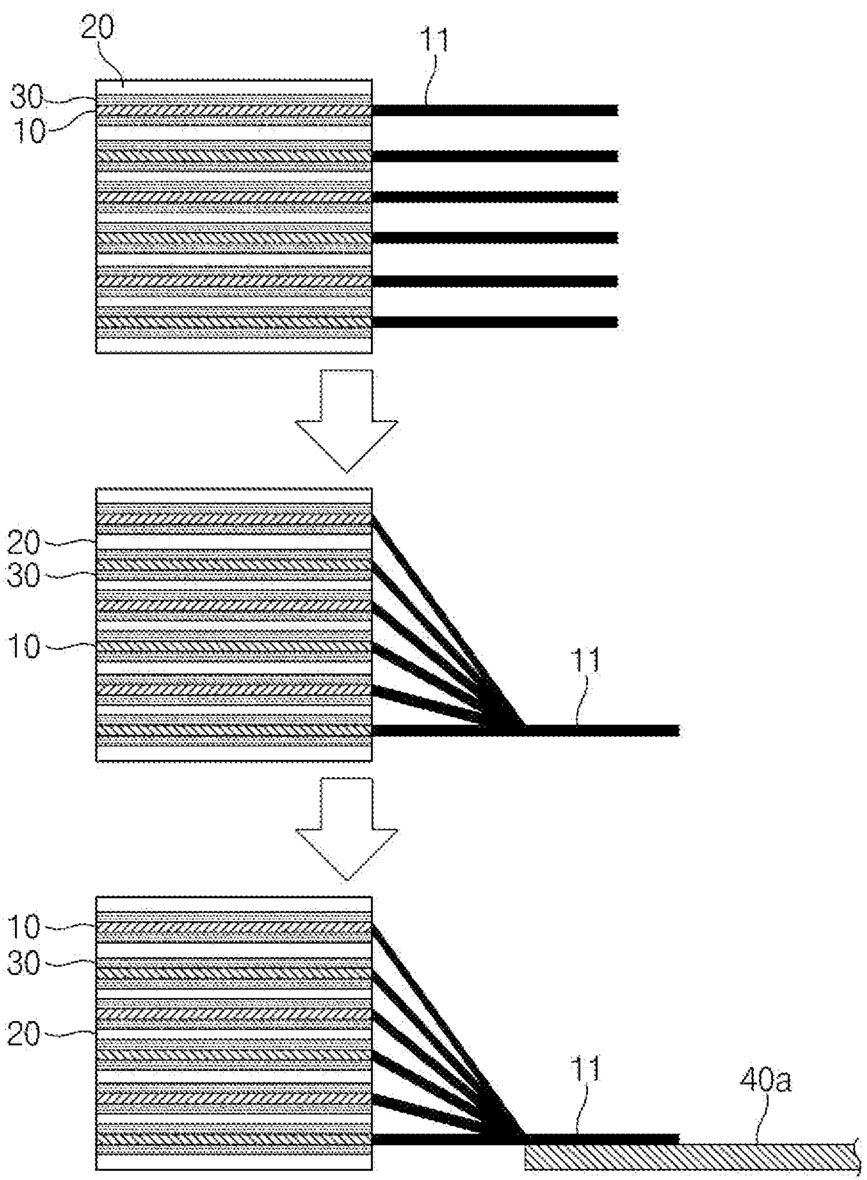
FIG. 1 illustrates operations of a method according to the related art in which electrode tabs of electrode assemblies are gathered and bonded to a lead (in FIG. 1, the electrode tabs are positive electrode tabs, and the lead is a positive electrode lead).

Hereinafter, the present invention will be described in detail with reference to the accompanying drawings to enable those skilled in the art to which the present invention pertains to easily carry out the present invention. The present invention may, however, be embodied in different forms and is not limited by the embodiments set forth herein.

The parts unrelated to the description will be ruled out in order to clearly describe the present invention. Like reference numerals refer to like elements throughout the whole specification.

Moreover, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe his or her invention in the best ways.

The present invention relates to a method for welding an electrode assembly, in which electrode tabs are welded to leads (a positive electrode lead and a negative electrode lead) in the electrode assembly having a plurality of stacked electrodes from which the electrode tabs protrude in one direction (negative electrodes having negative electrode tabs protruding therefrom, and positive electrodes having positive electrode tabs protruding therefrom). Hereinafter, preferred embodiments of the present invention will be described in more detail with reference to the accompanying drawings.

Figure 2:
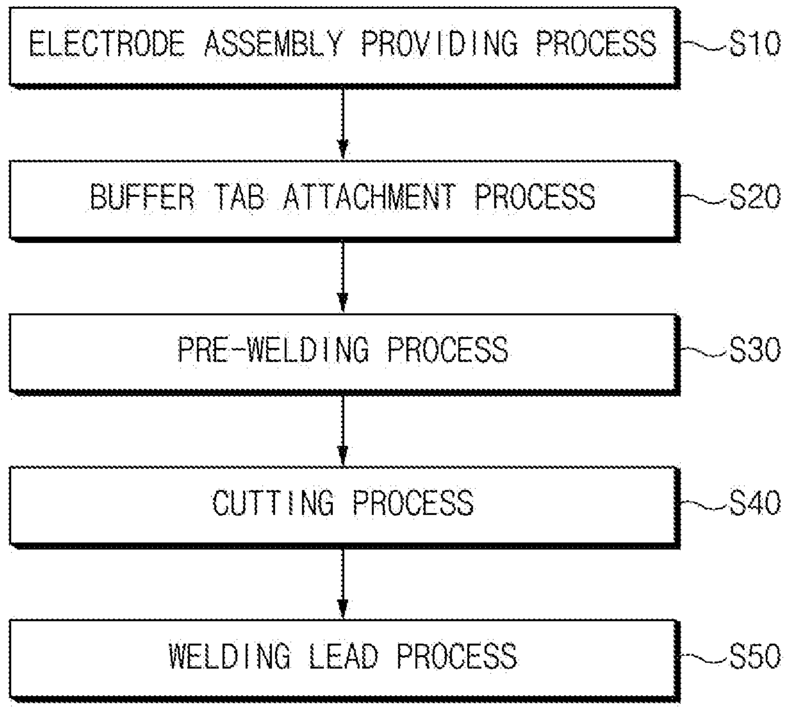
FIG. 2 is a flow chart illustrating, in order, respective operations of a method for welding an electrode assembly according to the present invention.

Referring to FIG. 2, which illustrates, in order, respective operations of the method for welding the electrode assembly according to the present invention, the welding method according to the present invention includes providing an electrode assembly (S10), attaching buffer tabs (S20), pre-welding (S30), cutting (S40), and welding leads (S50).

In the stacking of the plurality of electrodes to manufacture the electrode assembly (S10), the electrode assembly is manufactured by alternately disposing negative electrodes 20 and positive electrodes 10, while the electrodes and separators 30 are stacked so that each of the separators is interposed between the electrodes. Here, negative electrode tabs 21 and positive electrode tabs 11 protrude from the negative electrodes 10 and the positive electrodes 20, respectively. The negative electrode tabs 21 and the positive electrode tabs 11 are each disposed to be parallel with their respective tabs. In the stacking of the plurality of electrodes to manufacture the electrode assembly, the negative electrodes 20, the separators 30, and the positive electrodes are alternately stacked, and an aligning operation is performed after the stacking.

Figure 3:
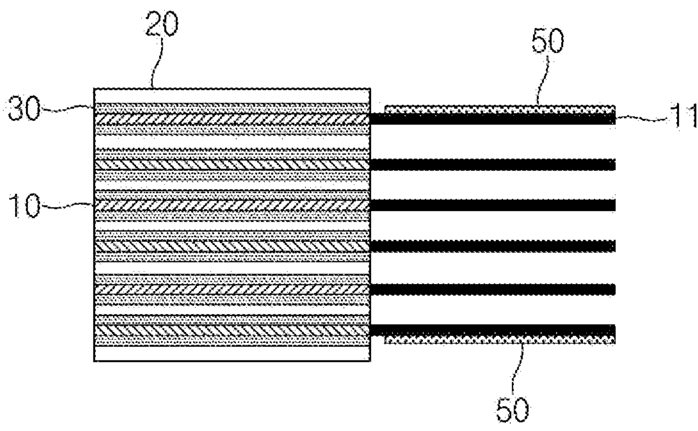
FIG. 3 is a view illustrating that buffer tabs are attached to surfaces of outermost electrode tabs (on an uppermost layer and a lowest layer) according to the present invention.

In the attaching of the buffer tab (S20), buffer tabs 50 are attached to surfaces of outermost electrode tabs 11 and 21 of the electrode assembly (FIG. 3 illustrates only the positive electrode tabs, but the negative electrode tabs are also attached in the same way). Referring to FIG. 3 illustrating that the buffer tabs 50 are attached to the surfaces of the outermost electrode tabs (on an uppermost layer and a lowest layer), the buffer tabs 50 in the attaching of the buffer tab (S20) are respectively attached to both an electrode tab disposed on the uppermost layer, and an electrode tab disposed on the lowest layer. Here, the buffer tabs 50 are respectively attached to a top surface of the electrode tab on the uppermost layer in contact with a welding rod (not illustrated), and a bottom surface of the electrode tab on the lowest layer in contact with each of leads 40*a* and 40*b*.

The buffer tabs 50 provided in the present invention are attached for the purpose for reducing the local stress and tensile force concentrated at a welded portion (i.e., for the purpose for preventing or reducing deformation of the electrode tab by not concentrating but distributing the pressure applied to the electrode tab). Thus, the buffer tabs 50 are attached to the electrode tabs to provide a function to increase strength and ductility. Here, spot welding may be performed on the buffer tabs 50, and the buffer tabs 50 are made of a material having electrical conductivity so that currents may flow through connection portions of the electrode tabs 11 and 21 and the leads 40*a* and 40*b*.

Thus, the buffer tabs 50 may be made of the same material as the electrode tabs having electrical conductivity, or a relatively softer material. Here, each of the buffer tabs 50 may be provided with a surface (or both surfaces) coated with an adhesive so that the buffer tabs 50 may be easily attached.

Alternately, each of the buffer tabs 50 may be provided as a tape having electrical conductivity and having at least one surface with adhesive property.

Figure 4:
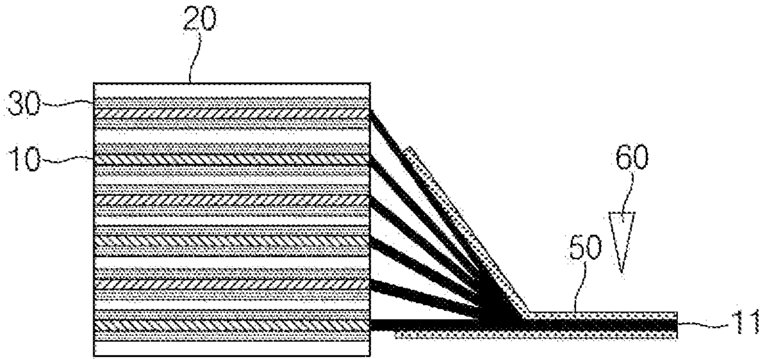
FIG. 4 is a view illustrating that that the electrode tabs are gathered to the electrode tab on the lowest layer in a state where the buffer tabs are attached to the outermost electrode tabs according to the present invention.

Then, the gathering and pre-welding (S30) are performed in which a plurality of electrode tabs 11 and 21 protruding from the electrode assembly are gathered to be welded so that the grouped electrode tabs are bonded to each other. That is, referring to FIG. 4 illustrating that the electrode tabs are gathered to the electrode tab on the lowest layer in a state where the buffer tabs 50 are attached on the outermost electrode tabs 11 and 21, the welding in the pre-welding (S30) is performed in a state where end portions of the electrode tabs are gathered in any one among the outermost electrode tabs, i.e., an electrode tab on the uppermost layer or the lowest layer, to form overlapping portions by a predetermined length.

In the pre-welding (S30), ultrasonic welding is used which has a relatively low bonding force but is quickly performed. The ultrasonic welding is performed by applying ultrasonic waves in a state where the electrode tabs and the buffer tabs 50 are stacked.

When the pre-welding (S30) is completed, the cutting (S40) may be selectively performed. In the cutting (S40), end portions of the buffer tabs 50 and end portions of the electrode tabs 11 and 21 are cut so that ends of the buffer tabs 50 and ends of the electrode tabs 11 and 21 are aligned with each other.

Figure 5:
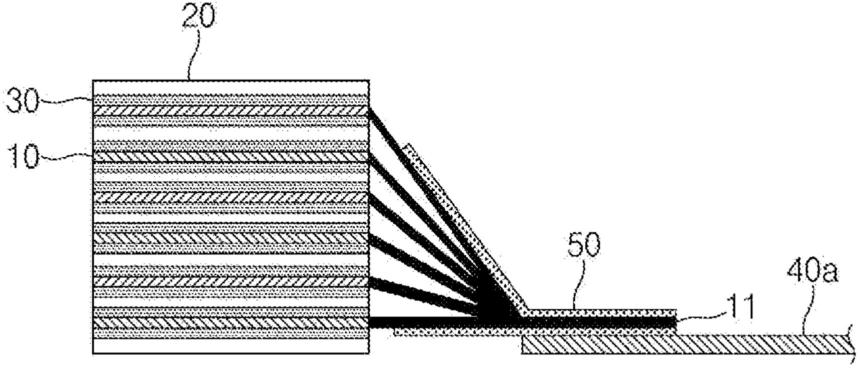
FIG. 5 is a view illustrating that the electrode tabs and a lead are bonded according to the present invention (in FIG. 5, the electrode tabs are positive electrode tabs, and the lead is a positive electrode lead).

Then, the welding of the lead (S50) is performed as in FIG. 5 illustrating that the electrode tabs and the lead are bonded according to the present invention. In the welding of the lead, spot welding is performed in a state where the outermost electrode tab and each of the leads 40*a* and 40*b* are in contact with each other to dispose each of the buffer tabs 50 therebetween.

When the operations as above (the stacking of the plurality of electrodes to manufacture the electrode assembly (S10), the attaching of the buffer tab (S20), the pre-welding (S30), the cutting (S40), and the welding of the lead (S50)) are completed, operations may be additionally performed such as inspecting a welded state, attaching a finishing tape to partially cover a portion having a lead protruding therefrom during insertion into a pouch, pressing the finishing tape, inspecting an outer appearance and a welded portion of the electrode assembly through an optical camera, and so on.

Figure 6:
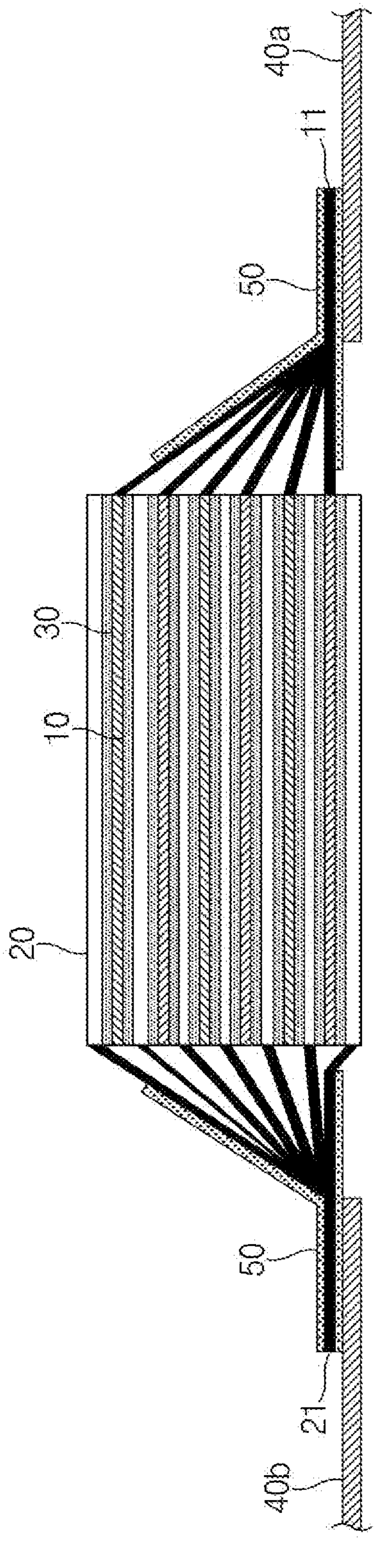
FIG. 6 is a view illustrating that electrode tabs and a lead are bonded at each of two sides of an electrode assembly according to the present invention (in FIG. 6, the electrode tabs and the lead at a left side are negative electrode tabs and a negative electrode lead, respectively, and the electrode tabs and the lead at a right side are positive electrode tabs and a positive electrode lead, respectively).

The operations may be performed in different orders according to the number and arrangement of the negative electrode tabs 21 and the positive electrode tabs 11. As in FIG. 6 illustrating that electrode tabs and leads are bonded at each of two sides of an electrode assembly, the positive electrode tabs 11 and the negative electrode tabs 21 are separately welded to a positive electrode lead 40*a* and a negative electrode lead 40*b*, respectively.

First Embodiment

The positive electrode tab 11 and the negative electrode tab 21, which respectively protrude from the positive electrode 10 and the negative electrode 20, are welded to a positive electrode lead 40*a* and a negative electrode lead 40*b*, respectively.

In this embodiment, after the stacking of the plurality of electrodes to manufacture the electrode assembly, the attaching of the buffer tab and the welding of the lead are completed on one of the positive electrode tab 11 and the negative electrode tab 21, and then the attaching of the buffer tab and the welding of the lead are re-performed on the other.

That is, when a device for attaching the buffer tab 50, an ultrasonic welding device, a spot welding device, etc. are disposed only at one position, a welding process may be performed by changing positions of the device for attaching the buffer tab 50, the ultrasonic welding device, and the spot welding device (for example, moving from a position, in which a work is performed on the positive electrode tab, to a position in which a work is performed on the negative electrode tab).

For example, when a first welding is performed on the positive electrode tab 11 and then a second welding is performed on the negative electrode tab 21, the attaching of the buffer tab to the positive electrode tab 11 and the welding of the lead to the positive electrode lead 40*a* may be performed, and then the device for attaching the buffer tab 50, the ultrasonic welding device, and the spot welding device may be moved to the negative electrode tab 21. The attaching of the buffer tab to the negative electrode tab 21 disposed in a direction opposite to the positive electrode lead 40*a*, and the welding of the lead to the negative electrode lead 40*b*, may be performed in sequence.

When the welding is separately performed on the positive electrode tab 11 and the negative electrode tab 21, not only the attaching of the buffer tab and the welding of the lead, but also the pre-welding and the cutting described above may be separately performed during the welding of the negative electrode tab 21 and the positive electrode tab 11. The operations as described above may be added such as inspecting a welded state, attaching a finishing tape to partially cover a portion having a lead protruding therefrom during insertion into a pouch, pressing the finishing tape, inspecting an outer appearance and a welded portion of the electrode assembly through an optical camera, and so on.

Second Embodiment

In this embodiment, the positive electrode tab 11 and the negative electrode tab 21, which respectively protrude from the positive electrode 10 and the negative electrode 20 included in the electrode assembly, are welded to the positive electrode lead 40*a* and the negative electrode lead 40*b*, respectively.

Also in this embodiment, after the stacking of the plurality of electrodes to manufacture the electrode assembly, the attaching of the buffer tab and the welding of the lead are completed on one of the positive electrode tab 11 and the negative electrode tab 21, and then the attaching of the buffer tab and the welding of the lead are re-performed on the other.

When the device for attaching the buffer tab 50, the ultrasonic welding device, the spot welding device, etc. are disposed only at one position like in the first embodiment, a welding process in this embodiment may be performed by changing the position of the electrode assembly (a direction in which the electrode tabs are headed).

For example, when a first welding is performed on the positive electrode tab 11 and then a second welding is performed on the negative electrode tab 21, the attaching of the buffer tab to the positive electrode tab 11 and the welding of the lead to the positive electrode lead 40*a* may be first performed. Then, the electrode assembly may rotate 180 degrees and the negative electrode tab 21, disposed in a direction opposite to the positive electrode lead 40*a*, may be disposed in a position where the positive electrode tab 11 has been disposed. Thereafter, the attaching of the buffer tab to the negative electrode tab 21, and the welding of the lead to the negative electrode lead 40*b*, may be performed in sequence.

Also in this embodiment, when the welding is separately performed on the positive electrode tab 11 and the negative electrode tab 21, not only the attaching of the buffer tab and the welding of the lead, but also the pre-welding and the cutting described above may be separately performed during the welding of the negative electrode tab 21 and the positive electrode tab 11. The operations as described above may be added such as inspecting a welded state, attaching a finishing tape to partially cover a portion having a lead protruding therefrom during insertion into a pouch, pressing the finishing tape, inspecting an outer appearance and a welded portion of the electrode assembly through an optical camera, and so on.

Third Embodiment

In this embodiment, the positive electrode tab 11 and the negative electrode tab 21, which respectively protrude from the positive electrode 10 and the negative electrode 20 included in the electrode assembly, are welded to the positive electrode lead 40*a* and the negative electrode lead 40*b*, respectively.

In this embodiment, after the stacking of the plurality of electrodes to manufacture the electrode assembly, the attaching of the buffer tab is completed on each of the positive electrode tab 11 and the negative electrode tab 21, and then the welding of the lead is performed on each of the positive electrode tab 11 and the negative electrode tab 21.

That is, when the device for attaching the buffer tab 50, the ultrasonic welding device, the spot welding device, etc. may be each provided in the same number as that of the electrode tabs so that the attaching of the buffer tab 50 and the welding may be separately performed on each of the positive electrode tab 11 and the negative electrode tab 21.

Thus, irrespective of which is subject to a first welding among the positive electrode tab 11 and the negative electrode tab 21, the attaching of the buffer tab and the welding of the lead may be performed separately and simultaneously.

Also in this embodiment, during the welding of each of the positive electrode tab 11 and the negative electrode tab 21, not only the attaching of the buffer tab and the welding of the lead, but also the pre-welding and the cutting described above, may be performed separately and simultaneously during the welding of the negative electrode tab and the positive electrode tab during the welding. The operations as described above may be simultaneously added for inspecting a welded state, attaching a finishing tape to partially cover a portion having a lead protruding therefrom during insertion into a pouch, pressing the finishing tape, inspecting an outer appearance and a welded portion of the electrode assembly through an optical camera, and so on.

In the method for welding the electrode assembly according to the present invention having the features as described above, the buffer tab 50 may be attached, before the welding, to the surface of the outermost electrode tab, thereby suppressing or preventing the damage of the electrode tab due to the pressure applied by the welding rod.

The buffer tab 50 may be attached to each of the electrode tab disposed on the uppermost layer and the electrode tab disposed on the lowest layer, thereby mitigating the stresses occurring in both the point in contact with the welding rod and the point in contact with the lead.

Moreover, the electrode tab and the buffer tab may be cut to have ends aligned with each other, thereby preventing the buffer tab from protruding from the electrode tab by inadvertent attachment.

The buffer tab 50 may be made of the same material as the electrode tab, and may be provided with the surface coated with the adhesive so as to be attachable to the outmost electrode tab, or provided as a tape having electrical conductivity and having at least one surface with an adhesive property so that easy attachment may be achieved.

Although the present invention has been described with reference to the limited embodiments and the accompanying drawings, the present invention is not limited thereto. The present invention may be variously implemented by those of ordinary skill in the art to which the present invention pertains, within the technical idea of the present invention and the scope equivalent to the appended claims.

DESCRIPTION OF THE SYMBOLS

10: Positive electrode
20: Separator
30: Negative electrode
40*a*, 40*b*: Lead
50: Buffer tab

The invention claimed is:

1. A method for welding an electrode assembly, comprising:

stacking a plurality of electrodes to manufacture the electrode assembly;

attaching a buffer tab to a surface of an outermost electrode tab of the electrode assembly;

welding a lead such that a plurality of electrode tabs and the lead are in contact with each other to dispose the buffer tab therebetween;

gathering and pre-welding the plurality of electrode tabs such that each electrode tab of the plurality of electrode tabs is bonded to each other, after the attaching of the buffer tab and before the welding of the lead; and cutting an end portion of the buffer tab and end portions of the plurality of electrode tabs so that an end of the buffer tab and ends of the plurality of electrode tabs are aligned with each other, after the pre-welding and before the welding of the lead, wherein the electrode assembly comprises a stacked plurality of electrodes comprising the lead welded to the plurality of electrode tabs, wherein each electrode tab of the plurality of electrode tabs protrudes in one direction from the plurality of electrodes, and wherein the buffer tab covers a region of the outermost electrode tab in which the plurality of electrode tabs are stacked and contact each other, and further covers a region of the outermost electrode tab in which the plurality of electrode tabs do not contact each other.

2. The method of claim 1, wherein in the attaching of the buffer tab, the buffer tab is attached to an electrode tab of the plurality of electrode tabs disposed on an uppermost layer and to an electrode tab of the plurality of electrode tabs disposed on a lowest layer.

3. The method of claim 1, wherein the pre-welding comprises ultrasonic welding, wherein the plurality of electrode tabs and the buffer tab in a stacked state are bonded by application of ultrasonic waves, and the welding of the lead comprises spot welding wherein the lead is in contact with the buffer tab.

4. The method of claim 1, wherein the buffer tab is made of the same material as the electrode tab, and wherein the buffer tab has a surface coated with an adhesive to be attachable to the outmost electrode tab.

5. The method of claim 1, wherein the buffer tab is a tape having electrical conductivity and having at least one surface with an adhesive property.

6. The method of claim 1, wherein the plurality of electrodes comprises a positive electrode and a negative electrode, wherein the plurality of electrode tabs comprises a negative electrode tab protruding from the negative electrode and a positive electrode tab protruding from the positive electrode, wherein the lead comprises a negative electrode lead welded to the negative electrode tab and a positive electrode lead welded to the positive electrode tab, and wherein after the stacking of the plurality of electrodes to manufacture the electrode assembly, the attaching of the buffer tab and the welding of the lead are performed on one of the positive electrode tab and the negative electrode tab, and then the attaching of the buffer tab and the welding of the lead are re-performed on the other of the positive electrode tab and the negative electrode tab.

7. The method of claim 6, wherein after the stacking of the plurality of electrodes to manufacture the electrode assembly, the attaching of the buffer tab and the welding of the lead are performed on one of the positive electrode tab and the negative electrode tab, and then the attaching of the buffer tab and the welding of the lead are performed on the other of the positive electrode tab and the negative electrode tab after the electrode assembly rotates 180 degrees.

8. The method of claim 1, wherein the plurality of electrodes comprises a positive electrode and a negative electrode, wherein the plurality of electrode tabs comprises a negative electrode tab protruding from the negative electrode and a positive electrode tab protruding from the positive electrode, wherein the lead comprises a negative electrode lead welded to the negative electrode tab, and a positive electrode lead welded to the positive electrode tab, and wherein after the stacking of the plurality of electrodes to manufacture the electrode assembly, the attaching of the buffer tab is completed on each of the positive electrode tab and the negative electrode tab, and then the welding of the lead is performed on each of the positive electrode tab and the negative electrode tab.

9. A method for welding an electrode assembly, comprising:

stacking a plurality of electrodes to manufacture the electrode assembly;

attaching a buffer tab to a surface of an outermost electrode tab of the electrode assembly; and welding a lead such that a plurality of electrode tabs and the lead are in contact with each other to dispose the buffer tab therebetween;

wherein the electrode assembly comprises a stacked plurality of electrodes comprising the lead welded to the plurality of electrode tabs, wherein each electrode tab of the plurality of electrode tabs protrudes in one direction from the plurality of electrodes, and wherein the buffer tab covers a region of the outermost electrode tab in which the plurality of electrode tabs are stacked and contact each other, and further covers a region of the outermost electrode tab in which the plurality of electrode tabs do not contact each other.

10. The method of claim 9, wherein in the attaching of the buffer tab, the buffer tab is attached to an electrode tab of the plurality of electrode tabs disposed on an uppermost layer and to an electrode tab of the plurality of electrode tabs disposed on a lowest layer.

11. The method of claim 9, further comprising, after the attaching of the buffer tab and before the welding of the lead, gathering and pre-welding the plurality of electrode tabs such that each electrode tab of the plurality of electrode tabs is bonded to each other.

12. The method of claim 11, wherein the pre-welding comprises ultrasonic welding, wherein the plurality of electrode tabs and the buffer tab in a stacked state are bonded by application of ultrasonic waves, and the welding of the lead comprises spot welding wherein the lead is in contact with the buffer tab.

13. The method of claim 11, further comprising, after the pre-welding and before the welding of the lead, cutting an end portion of the buffer tab and end portions of the plurality of electrode tabs so that an end of the buffer tab and ends of the plurality of electrode tabs are aligned with each other.

14. The method of claim 9, wherein the buffer tab is made of the same material as the electrode tab, and wherein the buffer tab has a surface coated with an adhesive to be attachable to the outmost electrode tab.

15. The method of claim 9, wherein the buffer tab is a tape having electrical conductivity and having at least one surface with an adhesive property.

16. The method of claim 9, wherein the plurality of electrodes comprises a positive electrode and a negative electrode, wherein the plurality of electrode tabs comprises a negative electrode tab protruding from the negative electrode and a positive electrode tab protruding from the positive electrode, wherein the lead comprises a negative electrode lead welded to the negative electrode tab and a positive electrode lead welded to the positive electrode tab, and wherein after the stacking of the plurality of electrodes to manufacture the electrode assembly, the attaching of the buffer tab and the welding of the lead are performed on one of the positive electrode tab and the negative electrode tab, and then the attaching of the buffer tab and the welding of the lead are re-performed on the other of the positive electrode tab and the negative electrode tab.

17. The method of claim 16, wherein after the stacking of the plurality of electrodes to manufacture the electrode assembly, the attaching of the buffer tab and the welding of the lead are performed on one of the positive electrode tab and the negative electrode tab, and then the attaching of the buffer tab and the welding of the lead are performed on the other of the positive electrode tab and the negative electrode tab after the electrode assembly rotates 180 degrees.

18. The method of claim 9, wherein the plurality of electrodes comprises a positive electrode and a negative electrode, wherein the plurality of electrode tabs comprises a negative electrode tab protruding from the negative electrode and a positive electrode tab protruding from the positive electrode, wherein the lead comprises a negative electrode lead welded to the negative electrode tab, and a positive electrode lead welded to the positive electrode tab, and wherein after the stacking of the plurality of electrodes to manufacture the electrode assembly, the attaching of the buffer tab is completed on each of the positive electrode tab and the negative electrode tab, and then the welding of the lead is performed on each of the positive electrode tab and the negative electrode tab.

* * * * *